Feb. 23, 1965  J. A. SOLGA  3,171,121
AIRCRAFT COLLISION WARNING SYSTEM
Filed Feb. 13, 1963  2 Sheets-Sheet 1

INVENTOR.
JOSEPH A. SOLGA
BY *Henry Hansen*
ATTORNEY

Feb. 23, 1965  J. A. SOLGA  3,171,121
AIRCRAFT COLLISION WARNING SYSTEM
Filed Feb. 13, 1963  2 Sheets-Sheet 2

INVENTOR.
JOSEPH A. SOLGA
BY
ATTORNEY 3,171,121
AIRCRAFT COLLISION WARNING SYSTEM
Joseph A. Selga, 103 Lee Ave., Alexandria, Va.
Filed Feb. 13, 1963, Ser. No. 258,360
8 Claims. (Cl. 343—6.5)
(Granted under Title 35, U.S. Code (1952), sec. 266)

The invention described herein may be manufactured and used by or for the Government of the United States of America for governmental purpose without the payment of any royalties thereon or therefor.

This invention relates to an aircraft collision warning system and more particularly to a system for measuring range and the time rate of change of range between aircraft.

Due to the increase in traffic of both military and commercial aircraft mid-air collisions between aircrafts have become a problem of growing concern. Some systems in use today for accomplishing aircraft collision avoidance and pilot warning use radio transmissions between the aircraft that are based on a determination of the location through measurements of altitudes, speed, range, direction or heading of an approaching aircraft or various combinations of these parameters. These systems are limited in azimuthal coverage, accuracy, and ability to recognize a true collision situation. Many are impractical because of the physical, environmental or economical considerations. Other aircraft collision warning systems operate on optical or infra-red theories but these are limited in range and are adversely affected by weather and visibility conditions.

The present invention contemplates an aircraft collision warning system which is highly reliable in determining a collision situation between aircraft and in providing such information to the pilot of either aircraft to enable him to change heading and avoid a disastrous collision. Alternatively or additionally, the information in voltage form may be used to effect an automatic change in heading to avoid the collision.

The present invention contemplates an aircraft collision warning system based upon measurement of range between aircraft at discrete time intervals to provide an indication of rate of change of range or distance between aircraft. Although the embodiment of the invention is disclosed as an aircraft collision warning system, it is contemplated that the system of the present invention is equally applicable to surface vehicles.

Therefore, it is an object of this invention to provide an aircraft collision warning system wherein a first aircraft is provided with the capability of detecting an impending collision with another aircraft located within a sphere of predetermined radius from the first aircraft.

Another object of the present invention is to provide an improved aircraft collision warning system which is universal in its application to all other aircraft and which can function under all types of weather and visibility conditions.

A further object of the present invention is to provide an improved aircraft collision avoidance and pilot warning system capable of determining when two or more aircraft are or are not approaching one another on a collision course.

Yet another object of the present invention is to provide an aircraft collision warning system wherein all aircraft within a predetermined spherical envelope of the first aircraft are kept under constant surveillance and which provides fast, accurate, and reliable information when a foreseeable collision situation occurs.

Other objects and many of the attendant advantages of this invention will be readily appreciated as the same becomes better understood by reference to the following detailed description when considered in connection with the accompanying drawings in which like reference numerals designate like parts throughout the figures thereof and wherein—

Figure 1:
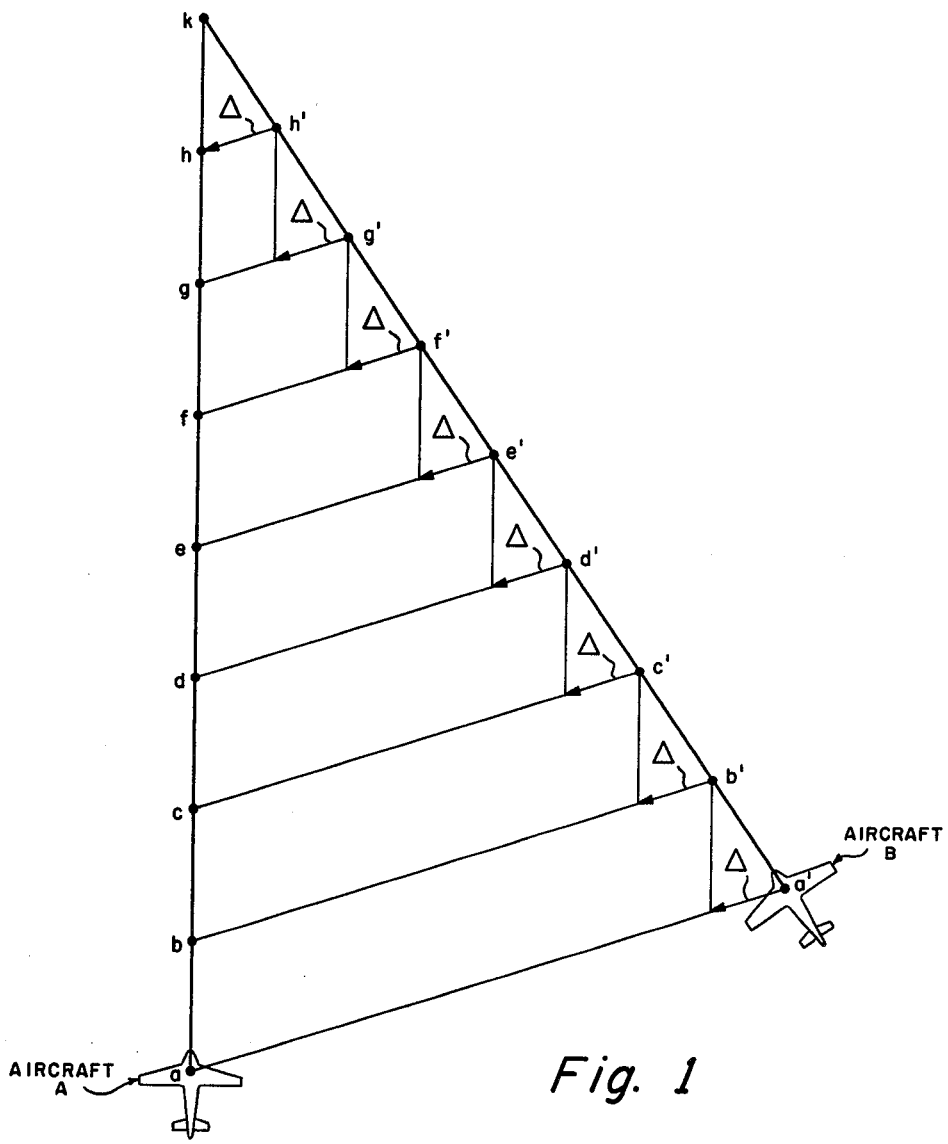
FIG. 1 is a geometrical presentation of two aircraft on a collision course.

Referring now to FIG. 1 more particularly there is shown in a geometrical configuration two aircraft A and B flying in the direction indicated. As shown on the drawing, the aircraft are on a collision course and are destined to collide at a point $k$. If the aircraft are not accelerating, the rate of change of distance between them, measured at discrete time intervals, is a constant. Thus, when the aircraft are on a collision course the range between the aircraft A and B is measured at discrete time intervals, the amount that each successive distance $aa'$, $bb'$, $cc'$, $dd'$, etc. differ from the last measured distance is a constant when a collision situation exists and is not a constant when no collision situation exists. This constant difference in distance is designated in the drawing by the distance $\Delta$.

The above proposition is also true for situations other than shown in FIG. 1, for example, as when one or the other aircraft is directly behind the other aircraft and is overtaking it, when the aircraft are approaching each other on a direct line, or when the aircraft are approaching each other on any angle of from an altitude.

Figure 2:
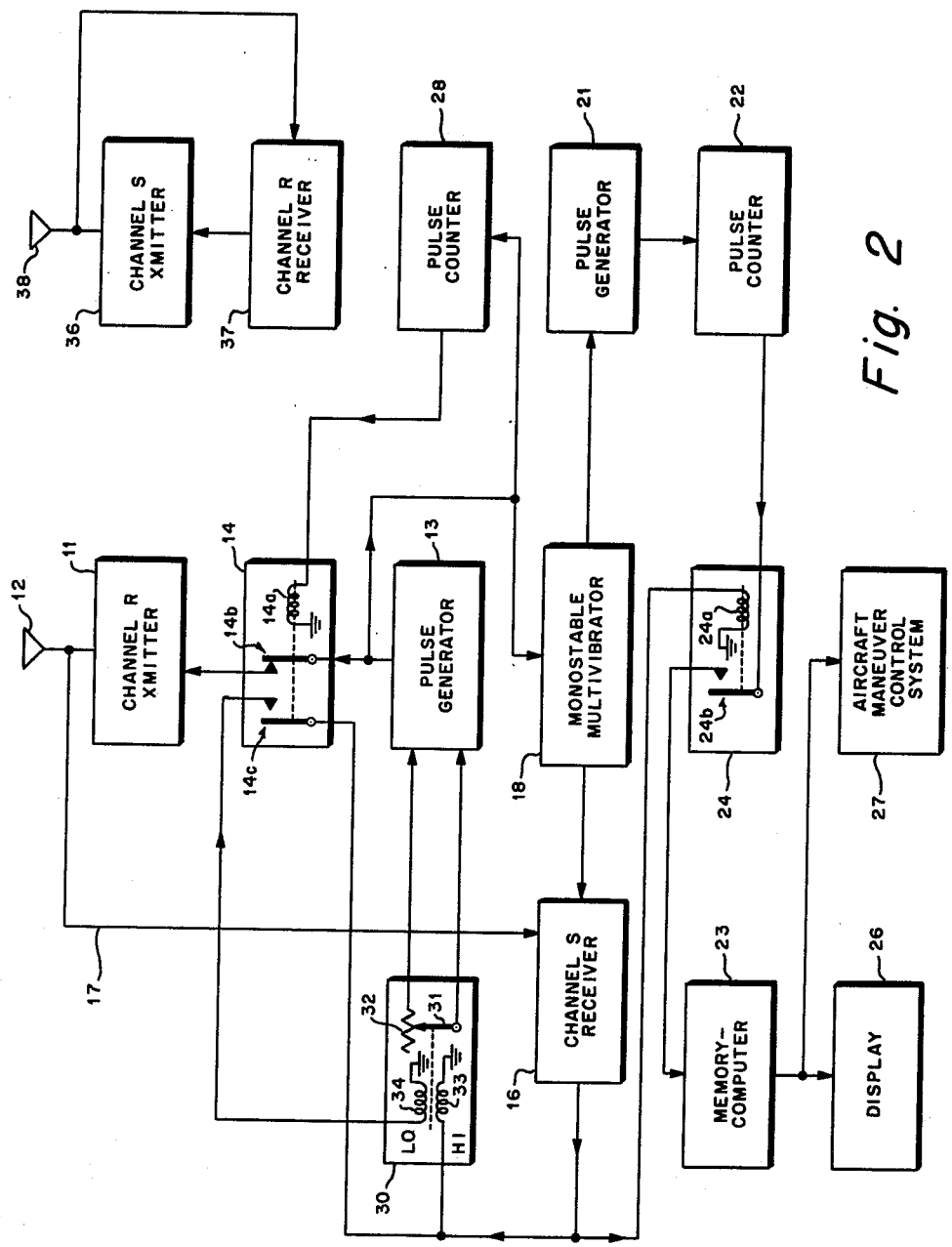
FIG. 2 illustrates in block diagram form one embodiment of the present invention.

FIG. 2 illustrates a complete system as carried in the aircraft A, but of course an identical system is incorporated in the aircraft B so that the collision avoidance communications loop will be complete as between them. In the drawing, aircraft A is shown as including a transmitter 11 and an antenna 12 therefor which is designed for transmitting a pulse repetition frequency (PRF) "signature" of known pulse width and frequency on a carrier frequency channel R. The transmitter 11 may comprise a conventional RF oscillator-amplifier which is biased off. A pulse generator 13 which may be a conventional free-running multivibrator is connected to the transmitter 11 through a switch 14 and provides, in a manner to be more fully explained hereinbelow, a trigger pulse to the transmitter 11.

A channel S receiver 16, which may be a conventional radio receiver preferably of the superheterodyne type, has its input connected to antenna 12 via conductor cable 17. This receiver is tuned for receiving an identical PRF on a different carrier frequency channel S.

The output of the pulse generator 13 is also connected to a mono-stable multivibrator 18. Thus, the trigger pulse from pulse generator 13 is operative to trigger the multivibrator 18 to thereby gate the receiver 16 to an ON condition for a preset time interval. The time interval during which receiver 16 is gated ON is determined by the maximum range at which it is desired to operate the system. For a fifty mile range the gated ON interval would be 500 micro-seconds.

Triggering of the mono-stable multivibrator 18 also causes a clock pulse generator 21 to turn ON for the time interval during which receiver 16 is gated ON. The output of the clock pulse generator 21 is fed directly into a pulse counter 22, which in turn is connected to a memory-computer 23 via a relay 24 comprising relay coil 24a and normally open contacts 24b. The memory-computer 23 may be a conventional magnetic binary storage unit comprising ferrite cores or a thin film memory. Conventional digital computer circuitry may be associated with the memory for shift register and automatic functions. The output of memory-computer 23 is connected to a display unit 26 and to a suitable aircraft control system 27 of known design symbolically shown as a block. The output of the receiver 16 is connected to the relay coil 24a to thereby close the relay contact 24b on receipt from the receiver 16 of a return pulse to be more fully explained hereinbelow.

The output of the pulse generator 13 is also connected to another pulse counter 28 whose output is connected to a coil 14a of the relay 14. The function of the counter 28 is to provide an output pulse to coil 14a of relay 14 a predetermined time after the occurrence of every ninth pulse from the pulse generator 13. The predetermined time after the occurrence of the ninth pulse from the pulse generator 13 after which counter 28 provides a pulse to energize the relay coil 14a is critical in that it must occur after receiver 16 has been turned OFF. For reasons to be more fully explained hereinafter this pulse from the counter 28, used to energize the relay coil 14a, must last throughout the interval started by the tenth pulse from the pulse generator 13 during which receiver 16 is gated ON. This pulse from counter 28 energizes relay coil 14a to open contacts 14b and close contacts 14c.

The pulse repetition frequency of the pulse generator 13 may be changed as by varying a potentiometer arm 31 along a resistor 32 of a PRF controller 30. The position of potentiometer arm 31 with respect to resistor 32 is varied by energization of a HI relay coil 33 or a LO relay coil 34. The HI coil 33 is directly connected to the output of the receiver 16 while the LO coil 34 is connected to the output of receiver 16 through normally open contacts 14c of the relay 14. The inductance of coils 33 and 34 are each chosen so that a pulse of predetermined amplitude is necessary to energize relay coil 33 sufficiently to thereby move the potentiometer arm 31 with respect to the resistor 32; or if the output from the receiver 16 is below a predetermined value and the contacts 14c are closed, then the relay coil 34 will be energized sufficiently to move the potentiometer arm 31 with respect to the resistor 32.

The system of the present invention further includes a channel S transmitter 36, a channel R receiver 37, and an antenna 38 for transmitting the same PRF on the channel S. The transmitter 36 is connected to the receiver 37, and the antenna 38 is connected in common to the receiver 37 and the output of the transmitter 36.

For each trigger pulse from the pulse generator 13, the transmitter 11 transmits an interrogating pulse on the channel R at a pulse repetition frequency (PRF) determined by the pulse generator 13; and each time the transmitter 11 transmits an interrogating pulse, the receiver 16 is gated ON by the multivibrator 18. The receiver 16 is gated ON for a period equal to the transmit and return time for the maximum range at which it is desired to operate the system of the present invention. For the maximum range chosen of 50 miles the receiver 16 is gated ON for 500 microseconds or 1/2000 of a second. If aircraft B, being similarly equipped, is within the chosen maximum range, the interrogating pulse on channel R of the transmitter 11 of aircraft A will be received by aircraft B's channel S receiver 37 to thereby trigger its channel S transmitter 36. This latter transmitter in aircraft B will then transmit an answer on channel S to be received by the channel S receiver 16 of the aircraft A during its gated ON period.

The channel S transmitter 36 of aircraft B is fired by the incoming interrogating pulses from aircraft A but they are not received in the channel S receiver 16 of aircraft A because it is gated OFF except for the aforementioned 1/2000 of each second. Incoming interrogating pulses from aircraft B, of course, are not received by aircraft A's receiver 16 since they are on different carrier frequency channels set at random.

Should an interrogating pulse be received by aircraft A which is the same frequency as channel R, and is pulsed coincident with the gated ON of the receiver 16, aircraft A's transmitter 36 would of course fire sometime during the 500 microsecond interval after the transmitter 11 fired. But, in such an event, the receiver 16 of aircraft A would detect the emission of its own transmitter 36, and this would energize the HI coil 33 to automatically change the pulse repetition rate in channel R thereby eliminating recurrence of this situation.

An answer on channel S to aircraft A's interrogating transmitter pulse on the channel R is received by aircraft A's receiver 16 during the latter's 500 microsecond gated ON interval. Since clock pulse generator 21 is on for the entire interval that the receiver 16 is gated ON, any output from aircraft A's receiver 16 caused by reception of an answer pulse to the interrogating pulse during this interval energizes the relay coil 24a to close contacts 24b. It will be observed that the pulse counter 22 continuously counts pulses from the clock pulse generator 21 even during the interval when contacts 24b are closed by energization of relay coil 24a, but the count is now registered in the memory-computer 23. Subsequent counts in successive intervals that the receiver 16 is gated ON are also registered in the memory-computer 23.

If the interrogating aircraft A is on a collision heading with the answering aircraft B, the time rate of change of decreasing distance remains constant as noted in FIG. 1. The memory-computer 23, by a count subtraction process described hereinbelow, detects this situation and provides an output warning signal indicative of an impending collision on the display 26. It is further contemplated that the output may be characterized to feed directly to the aircraft maneuver control system 27 to command a change in heading and thereby avoid a collision.

On the other hand, when the aircraft A and B are not on collision courses, memory-computer 23 correspondingly determines that the rate of change of distances between the two aircraft is not constant and accordingly provides an output signal indicative of a non-collision situation on the display 26.

The invention is operative even though there may be other planes emitting interrogating pulses and answer pulses on the two carrier frequencies channels R and S as selected for the system. This is by virtue of the PRF controller 30 which changes the pulse repetition frequency of the pulse generator 13. Hence there is no receipt nor interference of false pulses which would otherwise give an erroneous collision warning. However, a situation may arise wherein there is another interrogating plane, not aircraft B, which is beyond the reception range of aircraft A as determined by the interval during which aircraft A's receiver 16 is gated ON. If the other interrogating aircraft is transmitting an interrogating pulse on channel R, it may be received by aircraft A's receiver 16 by rebroadcast from aircraft B during its gated ON interval even though aircraft B is not answering aircraft A's interrogating pulses on the same channel. However, since aircraft A's pulse generator 13 is disconnected from its transmitter 11 throughout the interval during which the tenth transmitted pulse would normally be answered, receiver 16 could not possibly be receiving a channel S answer from aircraft B as a result of aircraft A's own transmission of a channel R interrogating pulse. Aircraft A will be apprised that it is receiving aircraft B's answer to the other aircraft which is out of the 50 mile range of aircraft A. It will be noted that contacts 14c are closed for the interval that the aircraft A's receiver 16 is gated ON during the tenth pulse of the generator 13, and the LO coil 34 is energized thereby displacing the potentiometer arm 31 with respect to resistor 32. This changes the pulse repetition frequency (PRF) of the pulse generator 13 an amount sufficient to alter the pulse repetition frequency in the gated ON interval of the receiver 16 thereby preventing succeeding erroneous pulses from being received.

If, on the other hand, the transmitter 36 in aircraft A is triggered during the time that its receiver 16 is gated ON, the resultant high power output from receiver 16 to the HI coil 33 will move the potentiometer arm 31 along the resistance 32 to change the pulse repetition frequency in the pulse generator 13 and to change the gate ON condition of the receiver 16 thereby eliminating any future reception of transmitted pulses from the transmitter 36 of aircraft A.

The operation of the system as in the situation illustrated in FIG. 1 will now be summarized. When aircraft A is at the position $a$, an interrogating PRF on channel R is transmitted to aircraft B at position $a'$. When the answering PRF on channel S is received from aircraft B, contact 24b closes to register a first pulse count from the counter 22 in the memory-computer 23. This count is proportional to the distance $aa'$. At position $b$, aircraft A transmits a second interrogation on channel R and receives an answer from aircraft B now at position $b'$. A second pulse count is also registered in the memory-computer 23 and the difference between the first and second pulse counts is determined which is proportional to the distance $\Delta$ in FIG. 1. This process is repeated at each of the successive positions $c$, $d$, $e$, etc. of aircraft A. Should successive values of the difference $\Delta$ be the same, a collision will occur at position $k$. Display 26 and system 27 are provided to afford manual or automatic control of aircraft A to deviate from the collision heading. The difference $\Delta$ is determined in the memory-computer 23 by any conventional binary digital technique.

It is contemplated that the system of the present invention may also be used in conjunction with other heading information in aircraft A to determine the heading of the approaching aircraft B. Alternately, the direction of the approaching aircraft B may be determined by using a second receiver and antenna in the aircraft A, which antenna is spaced as far as possible from the antenna 12. By measuring the difference in time of arrival of the answering channel B at each antenna the direction of the aproaching aircraft B can be automatically computed and displayed in any conventional manner such as by apparatus similar to the memory-computer 23.

For the most efficient use of the present invention it is desirable that a complete system such as illustrated in FIG. 2 be installed in all aircraft flown in high density traffic areas; but for economy and space or weight limitations, such as in small private aircraft, only one receiver 37, transmitter 36 and antenna 38 will suffice as a responder to the complete system on other aircraft. As between these aircraft, collision protection will still exist to the small aircraft through action taken by the fully-equipped aircraft.

It will be understood, of course, that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. In a collision warning device:
   transmitter means transmitting an interrogating pulse at a predetermined pulse repetition frequency,
   receiver means for receiving an answer pulse to said interrogating pulse,
   multivibrator means connected to said receiver means gating said receiver means on for a predetermined period following each transmitted interrogating pulse,
   counter means connected to said receiver means providing a count proportional to the time interval between transmission of an interrogating pulse and receipt of an answer pulse during the gate-on interval of said receiver means,
   computer means connected to said counter means for comparing successive counts within said counter providing an output when the difference between successive counts is constant,
   display means connected to said computer means providing an indication when the difference between successive counts is constant, said counter means comprising: a pulse generator turned on by said interrogating pulse, a counter to count pulses from said pulse generator, and switch means to send to said computer means the count on said counter at receipt of an answer pulse.

2. A collision warning device, comprising in combination:
   transmitter means for transmitting an interrogating pulse of a predetermined frequency,
   pulse generator means connected to said transmitter means providing trigger pulses at a predetermined pulse repetition frequency for triggering said transmitter means,
   receiver means for receiving an answer pulse to each of said interrogating pulses when said reciever means is in a gated-on condition,
   multivibrator means connected to said receiver means and said pulse generator means providing a gate-on pulse to said receiver means of a predetermined duration in response to each trigger pulse of said pulse generator means,
   clock pulse generator means,
   means connecting said multivibrator means to said clock pulse generator means for turning on said clock pulse generator means during the gate-on interval of said receiver means,
   pulse counter means connected to said clock pulse generator means,
   memory-computer means,
   relay means connected between said pulse counter means and said memory-computer means and to said receiver means for inserting the count in said pulse counter means into said memory-computer means each time said receiver means receives an answer pulse to said interrogating pulse during the gate-on interval of said receiver means,
   said memory-computer means including means for comparing successive counts of said pulse counter means representative of time intervals between a transmitted pulse and its answer pulse to provide an output when said successive counts differ from the last previous count by a constant amount,
   display means connected to said memory-computer means providing an indication in response to said output from said memory-computer means.

3. A collision warning device according to claim 2 wherein said relay means includes:
   normally open switch means connected between said pulse counter means and said memory-computer means,
   relay coil means connected to said receiver means energized by each of said answer pulses to momentarily close said switch means to cause the count present at that moment in said pulse counter means to be registered in said memory-computer means.

4. A collision warning device, comprising in combination:
   transmitter means for transmitting an interrogating pulse of a predetermined frequency,
   pulse generator means connected to said transmitter means providing trigger pulses at a predetermined pulse repetition frequency for triggering said transmitter means,
   receiver means for receiving an answer pulse to each of said interrogating pulses when said receiver means is in a gated-on condition,
   voltage responsive means connected between said pulse generator means and receiver means for changing the pulse repetition frequency of said pulse generator means in response to reception by said receiver means during said gated-on condition of a pulse above a predetermined amplitude,
   multivibrator means connected to said receiver means and said pulse generator means providing a gate-on pulse to said receiver means of a predetermined duration in response to each trigger pulse of said pulse generator means,
   clock pulse generator means, means connecting said multivibrator means to said clock pulse generator means for turning on said clock pulse generator means during the gate-on interval of said receiver means, pulse counter means connected to said clock pulse generator means, memory-computer means, relay means connected between said pulse counter means and said memory-computer means and to said receiver means for inserting the count in said pulse counter means into said memory-computer means each time said receiver means receives an answer pulse to said interrogating pulse during the gate-on interval of said receiver means, said memory-computer means including means for comparing successive counts of said pulse counter means representative of a time interval between a transmitted pulse and its answer pulse to provide an output when said successive counts differ from the last previous count by a constant amount, display means connected to said memory-computer means providing an indication in response to said output from said memory-computer means.

5. A collision warning device according to claim 3 wherein said relay means includes:

normally open switch means connected between said pulse counter means and said memory-computer means, relay coil means connected to said receiver means energized by each of said answer pulses to momentarily close said switch means to cause the count present at that moment in said pulse counter means to be registered in said memory-computer means.

6. A collision warning device, comprising in combination:

transmitter means for transmitting an interrogating pulse of a predetermined frequency, pulse generator means connected to said transmitter means providing trigger pulses at a predetermined pulse repetition frequency for triggering said transmitter means, receiver means for receiving an answer pulse to each of said interrogating pulses when said receiver means is in a gated-on condition, multivibrator means connected to said receiver means and said pulse generator means providing a gate-on pulse to said receiver means of a predetermined duration in response to each trigger pulse of said pulse generator means, first voltage responsive means connected to said pulse generator means for changing the pulse repetition frequency of said pulse generator means on receipt by said receiver means of a pulse above a predetermined amplitude, second voltage responsive means for changing the pulse repetition frequency of said pulse generator means in response to a pulse below said predetermined amplitude, first relay means connected between said transmitter means and said pulse generator means for disconnecting said pulse generator means from said transmitter means during the gate-on interval of said receiver means initiated every $n$th trigger pulse, clock pulse generator means, means connecting said multivibrator means to said clock pulse generator means for turning on said clock pulse generator means during the gate-on interval of said receiver means, pulse counter means connected to said clock pulse generator means, memory-computer means, second relay means connected between said pulse counter means and said memory-computer means and to said receiver means for inserting the count in said pulse counter means into said memory-computer means each time said receiver means receives an answer pulse to said interrogating pulse during the gate-on interval of said receiver means, said memory-computer means including means for comparing successive counts of said pulse counter means representative of time intervals between a transmitted pulse and its answer pulse to provide an output when said successive counts differ from the last previous count by a constant amount, display means connected to said memory-computer means providing an indication in response to said output from said memory-computer means.

7. A collision warning device according to claim 6 wherein said first relay means further comprises:

normally open switch means connected between said second voltage responsive means and said receiver means connecting said receiver means to said second voltage responsive means during the gate-on interval initiated every $n$th trigger pulse.

8. A collision warning device according to claim 6 wherein said second relay means includes:

normally open switch means connected between said pulse counter means and said memory-computer means, relay coil means connected to said receiver means energized by each of said answer pulses to momentarily close said switch means to cause the count present at that moment in said pulse counter means to be registered in said memory-computer means.

References Cited by the Examiner
UNITED STATES PATENTS

| | | | |
|---|---|---|---|
| 2,860,334 | 11/58 | Cowdery et al. | 343—112.4 |
| 2,957,082 | 10/60 | Plass | 343—112.4 |
| 2,969,539 | 1/61 | Miner | 343—112.4 |
| 2,991,463 | 7/61 | Lakatos et al. | 343—112.4 |
| 3,005,194 | 10/61 | Goodell et al. | 343—112.4 |
| 3,040,314 | 6/62 | Hesse | 343—112.4 |
| 3,113,211 | 12/63 | Thews | 343—112.4 |

CHESTER L. JUSTUS, *Primary Examiner.*